United States Patent
Phillips et al.

(10) Patent No.: US 10,783,514 B2
(45) Date of Patent: Sep. 22, 2020

(54) METHOD AND APPARATUS FOR USE IN PERSONALIZING IDENTIFICATION TOKEN

(75) Inventors: Simon Phillips, York (GB); Bengt Horsma, Brookfield, CT (US); Duncan Garrett, London (GB); David A. Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 1482 days.

(21) Appl. No.: 11/870,144

(22) Filed: Oct. 10, 2007

(65) Prior Publication Data

US 2009/0100511 A1    Apr. 16, 2009

(51) Int. Cl.
G06Q 20/32    (2012.01)
G06Q 20/20    (2012.01)
G06Q 20/34    (2012.01)
H04L 9/32     (2006.01)

(52) U.S. Cl.
CPC .......... *G06Q 20/327* (2013.01); *G06Q 20/20* (2013.01); *G06Q 20/3278* (2013.01); *G06Q 20/3552* (2013.01); *H04L 9/3234* (2013.01); *H04L 2209/56* (2013.01); *H04L 2209/805* (2013.01)

(58) Field of Classification Search
CPC ..... G06F 21/35; G06F 21/34; G06Q 20/3674; G06Q 20/3552; G06Q 20/327
USPC ................................ 705/65; 726/9
See application file for complete search history.

(56) References Cited

U.S. PATENT DOCUMENTS

| | | |
|---|---|---|
| 5,276,311 A | 1/1994 | Hennige |
| 5,585,787 A | 12/1996 | Wallerstein |
| 5,955,961 A | 9/1999 | Wallerstein |
| 6,315,195 B1 | 11/2001 | Ramachandran |
| 6,353,811 B1 | 3/2002 | Weissman |
| 6,561,432 B1 | 5/2003 | Vedder et al. |
| 6,631,849 B2 | 10/2003 | Blossom |

(Continued)

FOREIGN PATENT DOCUMENTS

| | | | |
|---|---|---|---|
| EP | 1638264 A1 * | 3/2006 | ............ H04L 29/06 |
| WO | 98/33193 A1 | 7/1998 | |

(Continued)

OTHER PUBLICATIONS

"Personalize or personalise." Collins English Dictionary. London: Collins, 2000. Credo Reference [online][retrieved on Apr. 2, 2009]. Retrieved from: <http://www.credoreference.com/entry/2678882/.>.*

(Continued)

*Primary Examiner* — Peter H Choi
*Assistant Examiner* — Monica A Mandel
(74) *Attorney, Agent, or Firm* — Buckley, Maschoff & Talwalkar LLC (57) ABSTRACT

According to some embodiments, a method comprises: storing, in a personalization token, information to personalize an identification token; issuing the personalization token to an account holder; and transmitting the information from the personalization token to the identification token using a wireless interface. According to some embodiments, apparatus comprises: a personalization token issued to an account holder, the personalization token comprising: information to personalize an identification token; and a wireless communication interface to transmit the information to the identification token.

17 Claims, 11 Drawing Sheets

(56) References Cited

U.S. PATENT DOCUMENTS

| | | | |
|---|---|---|---|
| 6,715,679 B1 | 4/2004 | Infosino | |
| 6,748,532 B1* | 6/2004 | Digiorgio et al. | 713/159 |
| 6,764,005 B2 | 7/2004 | Cooper | |
| 6,766,952 B2 | 7/2004 | Luu | |
| 6,863,220 B2 | 3/2005 | Selker | |
| 6,880,079 B2* | 4/2005 | Kefford et al. | 713/155 |
| 6,978,940 B2 | 12/2005 | Luu | |
| 7,012,504 B2 | 3/2006 | Tuttle | |
| 7,072,869 B2* | 7/2006 | Guthery | 705/67 |
| 7,143,419 B2 | 11/2006 | Fischer et al. | |
| 7,204,412 B2 | 4/2007 | Foss, Jr. | |
| 7,228,155 B2* | 6/2007 | Saunders | 455/558 |
| 7,246,172 B2 | 7/2007 | Yoshiba et al. | |
| 7,293,717 B1* | 11/2007 | Pathmasuntharan et al. | 235/492 |
| 7,415,138 B2* | 8/2008 | Schneider et al. | 382/115 |
| 7,702,538 B2* | 4/2010 | Rau et al. | 705/21 |
| 2002/0082925 A1* | 6/2002 | Herwig | 705/16 |
| 2002/0116330 A1* | 8/2002 | Hed et al. | 705/39 |
| 2003/0132301 A1 | 7/2003 | Selker | |
| 2003/0182242 A1* | 9/2003 | Scott et al. | 705/65 |
| 2004/0124248 A1 | 7/2004 | Selker | |
| 2004/0127256 A1* | 7/2004 | Goldthwaite et al. | 455/558 |
| 2004/0223305 A1 | 11/2004 | Amoit et al. | |
| 2004/0256451 A1* | 12/2004 | Goman et al. | 235/380 |
| 2005/0258245 A1 | 11/2005 | Bates et al. | |
| 2006/0137464 A1 | 6/2006 | Baudendistel | |
| 2006/0213982 A1* | 9/2006 | Cannon et al. | 235/380 |
| 2006/0219776 A1* | 10/2006 | Finn | 235/380 |
| 2007/0055630 A1* | 3/2007 | Gauthier et al. | 705/44 |
| 2007/0131780 A1* | 6/2007 | Ho | 235/492 |
| 2007/0241182 A1* | 10/2007 | Buer | 235/380 |
| 2007/0262134 A1* | 11/2007 | Humphrey | G06Q 20/105 235/379 |
| 2008/0011859 A1 | 1/2008 | Phillips | |
| 2008/0035740 A1 | 2/2008 | Tanner | |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0061151 A1 | 3/2008 | Phillips | |
| 2008/0114696 A1* | 5/2008 | Singh et al. | 705/66 |
| 2008/0121707 A1 | 5/2008 | Phillips et al. | |
| 2008/0140667 A1* | 6/2008 | LaBiche | 707/10 |
| 2008/0165006 A1 | 7/2008 | Phillips | |
| 2008/0314971 A1* | 12/2008 | Faith et al. | 235/379 |
| 2009/0063345 A1* | 3/2009 | Erikson | 705/44 |
| 2009/0065575 A1 | 3/2009 | Phillips et al. | |
| 2009/0065587 A1 | 3/2009 | Phillips | |

FOREIGN PATENT DOCUMENTS

| | | |
|---|---|---|
| WO | 99/38173 A1 | 7/1999 |
| WO | 00/79546 A1 | 12/2000 |

OTHER PUBLICATIONS

"Operable." Collins English Dictionary. London: Collins, 2000. Credo Reference [online][retrieved on Apr. 17, 2009]. Retrieved from: <http://www.credoreference.com/entry/2675221/.>.*
Derfler, F.J. How Networks Work, Millennium Edition. Que Corporation, Indianapolis, IN, 2000. All pages.*
"Separately." Webster's Third New International Dictionary, Unabridged. Merriam-Webster, Incorporated, 1993. [online][retrieved on Oct. 7, 2009]. Retrieved from: <http://lionreference.chadwyck.com/searchFulltext.do?id=31482758&idType=offset&divLevel=2&queryId=../session/1254961583_6235&area=mwd&forward=refshelf&trail=refshelf>.*
"Capability." Webster's Third New International Dictionary, Unabridged. Merriam-Webster, Incorporated, 1993. [online][retrieved on Oct. 7, 2009]. Retrieved from: <http://lionreference.chadwyck.com/searchFulltext.do?id=5082000&idType=offset&divLevel=2&queryId=../session/1254962278_9785&area=mwd&forward=refshelf&trail=refshelf>.*
"Card 1." Collins English Dictionary. London: Collins, 2000. Credo Reference. Web. Feb. 9, 2013.*
Business Wire. "HSBC launches mobile phone payments pilot." (Feb. 1, 2007). [online] [retrieved on Jun. 11, 2020]. Retrieved from: Dialog. URL: <https://dialog.proquest.com/professional/docview/672005614?accountid=131444>. (Year: 2007).*
International Standard, "Identification cards—Physical Characteristics", ISO/IEC 7810, Third Edition, Nov. 1, 2003, 18pgs.
"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.
"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.
"JCB pilots contactless payments", Apr. 1, 2004, [Retrieved Mar. 31, 2009]. Retrieved from URL: http://www.finextra.com/fullstory.asp?id=11549, 2pgs.
JCB delivers contactless Offica service over Casio wrist watch, Jun. 14, 2004, [Retrieved Mar. 31, 2009]. Retrieved from URL: http://www.finextra.com/fullstory.asp?id=11994, 2pgs.
"MasterCard launches OneSmart Paypass", Nov. 2, 2004, [Retrieved Mar. 31, 2009]. Retrieved from URL: http://www.finextra.com/fullstory.asp?id=12788, 2pgs.
"Visa launches contactless payments system in US", Feb. 25, 2005, [Retrieved Mar. 31, 2009]. Retrieved from URL: http://www.finextra.com/fullstory.asp?id=13291, 2pgs.
"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.
Ian Rowley (in Tokyo), "$5,000? Put It on My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.
"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.
Michael Fitzgerald, "Use your Cell Phone Instead of Your Credit Card", Monday, Sep. 19, 2005, PC World Communications, Inc., 2ps.
"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.
"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.
"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.
"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.
"Wristwatch With Built-In Credit Card", Saturday, May 26, 2007, [Retrieved Mar. 30, 2009]. Retrieved from URL: http://www.funniestgadgets.com/2007/05/26/wristwatch-with-built-in-credit-card/, 3pgs.
Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.
"Credit Card Rings (1964)", Thursday, Sep. 13, 2007, PALEOFUTURE, [Retrieved Mar. 30, 2009]. Retrieved from URL: http://www.paleofuture.com/blog/2007/9/14/credit-card-rings-1964.html, 5pgs.

\* cited by examiner

METHOD AND APPARATUS FOR USE IN PERSONALIZING IDENTIFICATION TOKEN

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) terminal. The wireless interface often includes a radio frequency identification integrated circuit (RFID IC) and an antenna to receive a power signal from and/or communicate with the POS terminal.

Proximity payment devices are often card-shaped and resemble a standard credit card in appearance. However, there have also been proposals to equip consumer devices, such as cell phones and wristwatches, with proximity payment capabilities.

One issue associated with such proposals is how to provide such consumer devices with a payment account number and/or other information to allow the consumer device to operate as a proximity payment device. There have been proposals to transmit a payment account number and/or other information to cell phones via the cellular network. However, using a cellular network to provide the payment account number and/or other information raises various issues. First, cellular networks can be unreliable. Second, many consumer devices do not have the capability to communicate with a cellular network.

DETAILED DESCRIPTION

Figure 1:
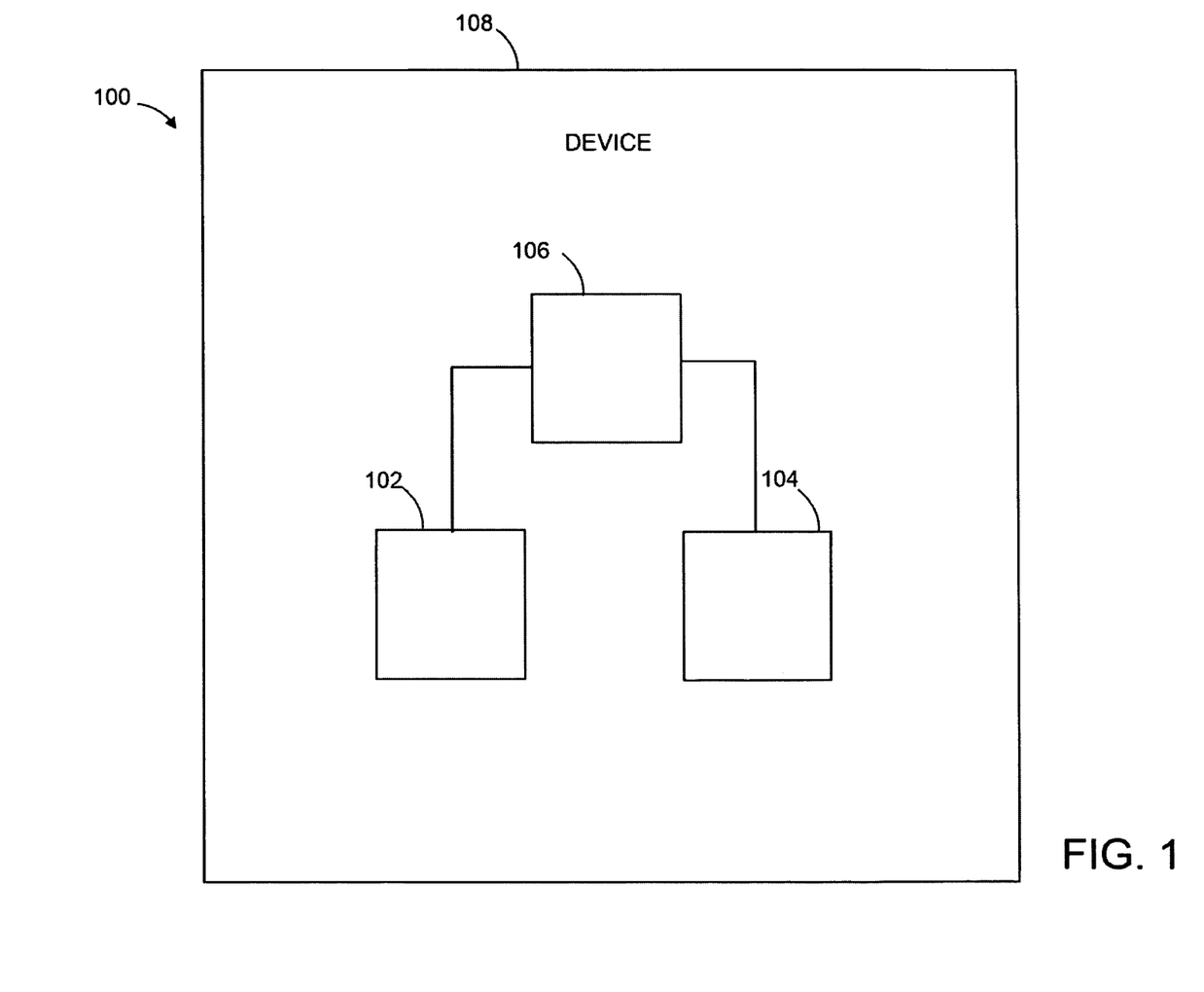
FIG. 1 is a schematic block diagram of a device in accordance with some embodiments.

FIG. 1 is a schematic block diagram of a device 100 with which one or more embodiments of the present invention may be employed. As further described hereinafter, in accordance with some embodiments, the device 100 may comprise a cell phone, a music player, a video player, a personal digital assistant (PDA), a wristwatch, and/or any other type of consumer or portable device to be provided with the capability to operate as a proximity payment device.

Referring to FIG. 1, in accordance with some embodiments, the device 100 may comprise first and second subsystems 102, 104. If the device 100 comprises a cell phone, the first subsystem 102 may include circuitry and/or other components to perform wireless communication with a cellular network. If the device 100 comprises a music player, the first subsystem 102 may comprise circuitry and/or other components to play music. If the device 100 comprises a video player, the first subsystem 102 may comprise circuitry and/or other components to play video (with or without associated audio). If the device 100 comprises a PDA, the first subsystem 102 may comprise circuitry and/or other components to perform one or more functions of the PDA. If the device 100 comprises a wristwatch, the first subsystem 102 may comprise circuitry and/or other components to perform one or more functions of the wristwatch.

The second subsystem 104 comprises a wireless communication interface and if provided with a payment account number and/or other information, is capable of operating as a proximity payment device. Accordingly, the second subsystem 104 is sometimes referred to herein as the proximity payment subsystem or the proximity payment device. As will be appreciated, the device 100 may also be referred to as a proximity payment device.

Although the second subsystem 104 is shown separate from the first subsystem 102, in some embodiments, the first subsystem 102 and the second subsystem 104 may share one or more circuits and/or components.

The device 100 may further include a power source 106 and a support structure 108. The power source 106 may be coupled (directly and/or indirectly) and/or supply power (directly and/or indirectly) to the first subsystem 102 and/or the second subsystem 104. In some embodiments, the power source 106 comprises a battery. If the device 100 comprises a cell phone, a music player, a video player, a PDA and/or a wristwatch, the power source 106 may power the cell phone, the music player, the video player, the PDA and/or the wristwatch, respectively.

The support structure 108 supports the first and second subsystems 102, 104. If the device 100 includes a power source 106, the support structure 108 may also support the power source. As used herein, the phrase "supports the first and second subsystems" means that the first and second subsystem 102, 104 are at least (i) partially and/or entirely disposed on, disposed in, contained in, mounted on, mounted in, installed on, installed in and/or embedded in the support structure 108 and/or (ii) partially and/or entirely disposed on, disposed in, contained in, mounted on, mounted in, installed on, installed in and/or embedded in one or more components that are supported by the support structure 108. In some embodiments, support structure 108 comprises a housing, a casing and/or a body. In some embodiments, a body may comprise a plastic body. If the device 100 comprises a cell phone, a music player, a video player, a PDA and/or a wristwatch, the support structure 108 may comprise a housing for the cell phone, the music player, the video player, the PDA and/or the wristwatch, respectively.

Figure 2:
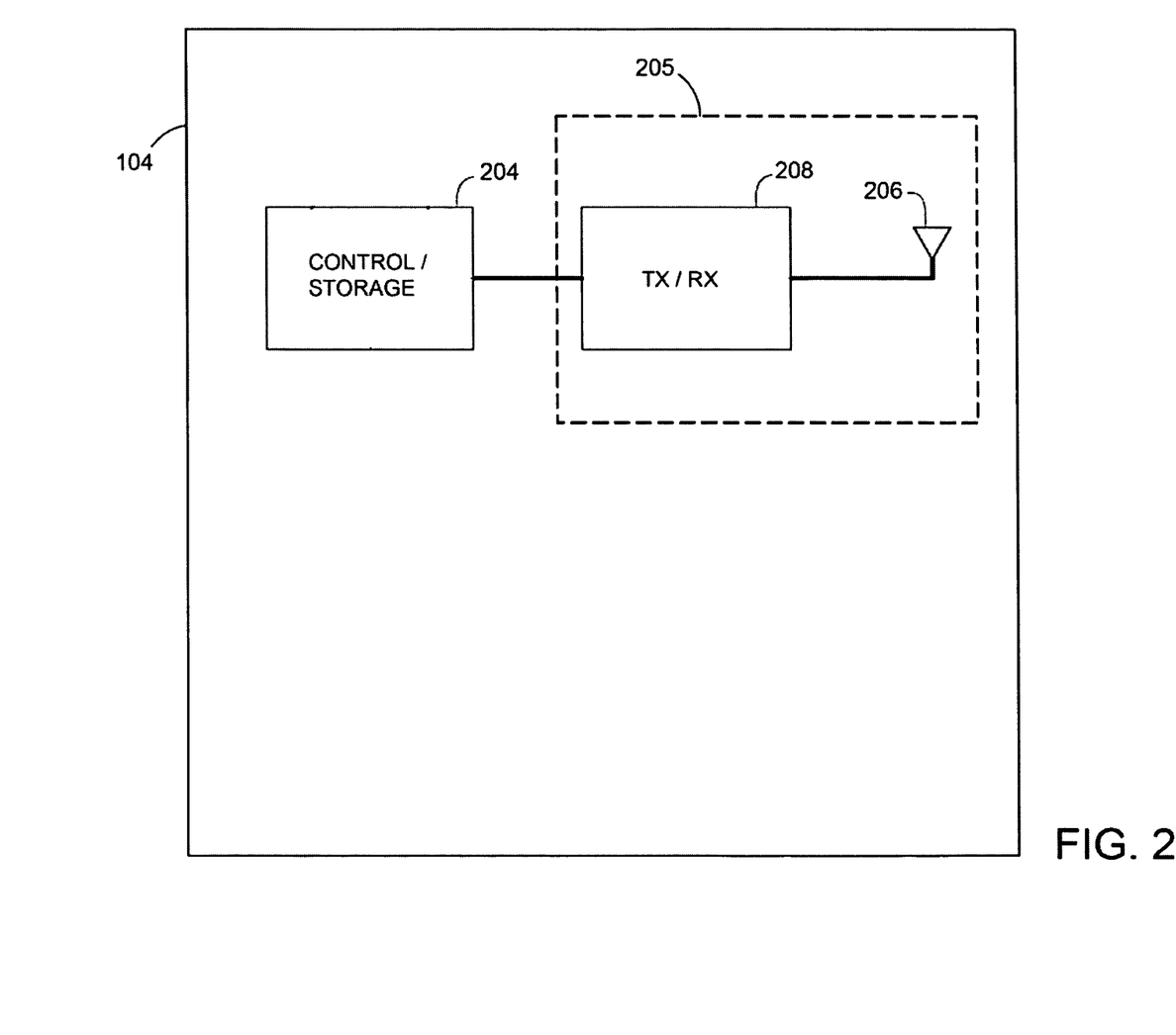
FIG. 2 is a schematic block diagram of a proximity payment subsystem, according to some embodiments.

FIG. 2 is a schematic block diagram of the second subsystem 104, according to some embodiments. Referring to FIG. 2, in accordance with some embodiments, the second subsystem 104 includes control/storage circuitry 204 and a wireless communication interface 205.

The control/storage circuitry 204 is operative to store a payment account number and/or other information to be transmitted to a POS terminal. In some embodiments, the control/storage circuitry 204 may be a simple memory device capable only of responding to a pre-defined set of commands. In some other embodiments, the control/storage circuitry 204 may comprise a secure microcontroller capable of executing a pre-defined program.

The wireless communication interface 205 facilitates wireless communication with a POS terminal. In some embodiments, wireless communication interface 205 comprises an antenna 206 and transmit/receive circuitry 208. The antenna 206 is configured to transmit and receive radio frequency (RF) signals and may comprise a loop antenna and/or any other suitable configuration. The transmit/receive circuitry 208 couples the antenna 206 to the control/storage circuitry 204.

In operation, wireless communication signals (e.g., RF signals) are received by the antenna 206 and supplied to the transmit/receive circuitry 208, which in response, provides signals that are supplied to the control/storage circuitry 204. The control/storage circuitry 204 also provides signals that are supplied to the transmit/receive circuitry 208, which in response, provides signals that are supplied to the antenna 206 and transmitted thereby.

In some embodiments, the control/storage circuit 204 and the transmit/receive circuitry 208 are disposed in a single integrated circuit. In some embodiments, the control/storage circuitry 204 and the transmit/receive circuitry 208 are disposed in an RFID IC. In some embodiments, the control/storage circuit 204 and the transmit/receive circuitry 208 are disposed in an IC that uses NFC technology, such as, for example, an NFC IC provided by PHILIPS ELECTRONICS or NXP Semiconductors.

Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. Some embodiments may include further features. Some other embodiments may comprise other configurations altogether.

It is desirable to have the capability to provide the device 100 with a payment account number and/or other information that provides the device 100 with the capability to operate as a proximity payment device.

In accordance with some embodiments of the present invention, a personalization token 300 may be issued to an account holder and may be used by the account holder to provide the device 100 with a payment account number and/or other information that provides the device 100 with the capability to operate as a proximity payment device. In some embodiments, the personalization token may have the form of a portable hand held device.

Figure 3:
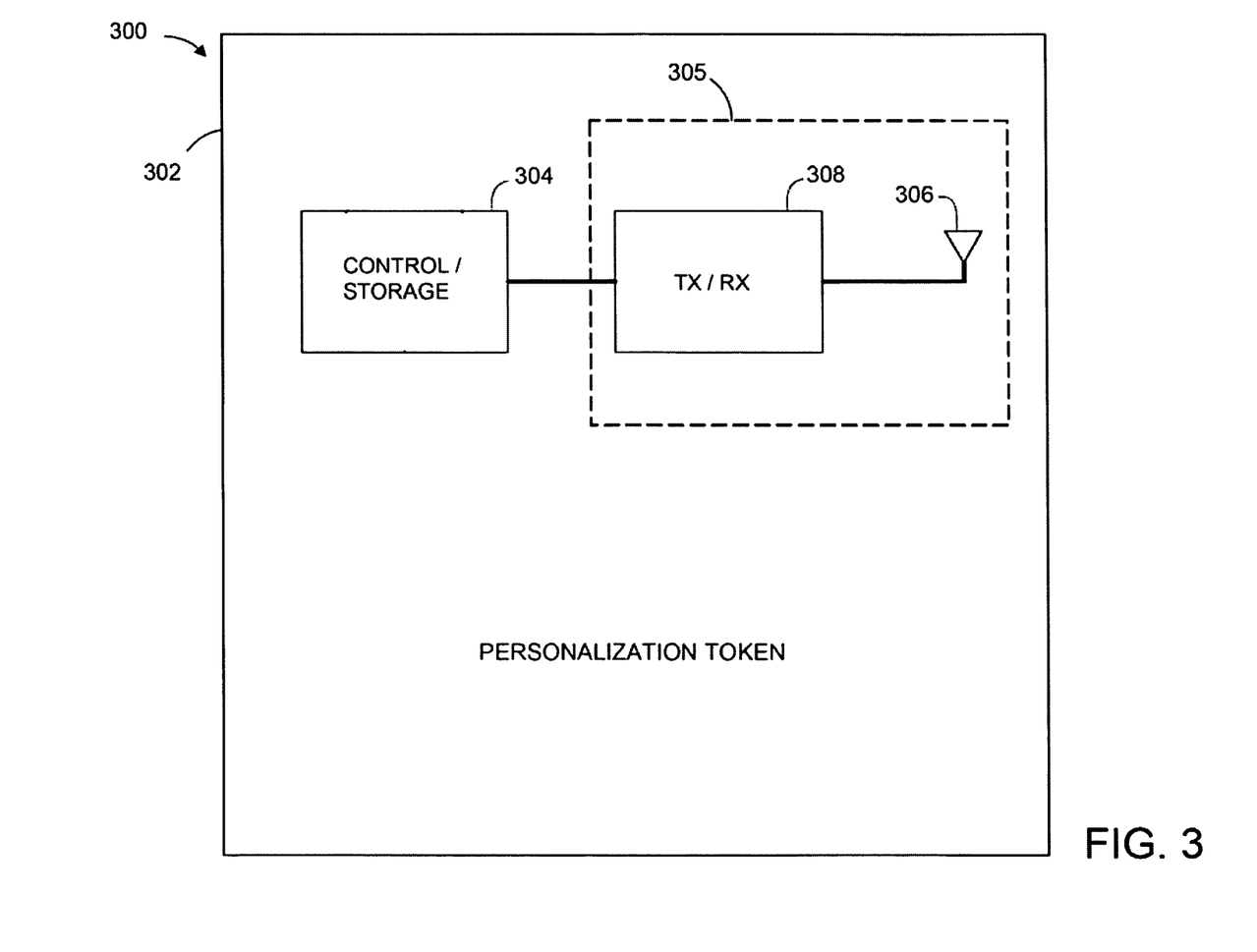
FIG. 3 is a schematic block diagram of a personalization token, according to some embodiments.

FIG. 3 is a schematic block diagram of a personalization token to provide the device 100 with a payment account number and/or other information, in accordance with some embodiments. Referring to FIG. 3, in some embodiments, the personalization token includes a support structure 302, control/storage circuitry 304 and a wireless communication interface 305.

The control/storage circuitry 304 stores information to personalize a proximity payment device. In some embodiments, the control/storage circuitry 304 may be a simple memory device capable only of responding to a pre-defined set of commands. In some other embodiments, the control/storage circuitry 304 may comprise a secure microcontroller capable of executing a pre-defined program.

The wireless communication interface 305 facilitates wireless communication with the proximity payment device. In some embodiments, wireless communication interface 305 comprises an antenna 306 and transmit/receive circuitry 308. The antenna 306 is configured to transmit and receive radio frequency (RF) signals and may comprise a loop antenna and/or any other suitable configuration. The transmit/receive circuitry 308 couples the antenna 306 to the control/storage circuitry 304.

In operation, wireless communication signals (e.g., RF signals) are received by the antenna 306 and supplied to the transmit/receive circuitry 308, which in response, provides signals that are supplied to the control/storage circuitry 304. The control/storage circuitry 304 also provides signals that are supplied to the transmit/receive circuitry 308, which in response, provides signals that are supplied to the antenna 306 and transmitted thereby.

In some embodiments, the control/storage circuit 304 and the transmit/receive circuitry 308 are disposed in a single integrated circuit. In some embodiments, the control/storage circuitry 304 and the transmit/receive circuitry 308 are disposed in an RFID IC. In some embodiments, the control/storage circuit 304 and the transmit/receive circuitry 308 are disposed in an IC that uses NFC technology, such as, for example, an NFC IC provided by PHILIPS ELECTRONICS or NXP Semiconductors.

The support structure 302 supports the control/storage circuitry 304 and the wireless interface 305. As used herein, the phrase "supports the control/storage circuitry and the wireless interface" means that the control/storage circuitry and the wireless interface are at least (i) partially and/or entirely disposed on, disposed in, contained in, mounted on, mounted in, installed on, installed in and/or embedded in the support structure 302 and/or (ii) partially and/or entirely disposed on, disposed in, contained in, mounted on, mounted in, installed on, installed in and/or embedded in one or more components that are supported by the support structure 302. In some embodiments, support structure 302 comprises a housing, casing and/or body. In some embodiments, a body may comprise a plastic body.

In some embodiments, the personalization token may comprise a proximity payment device. Thus, the personalization token may also operate as a proximity payment device. In such embodiments, the control/storage circuitry 304 may be operative to store a payment account number and/or other information to be transmitted to a POS terminal, and the wireless communication interface 305 may facilitate wireless communication with a POS terminal.

Figure 4:
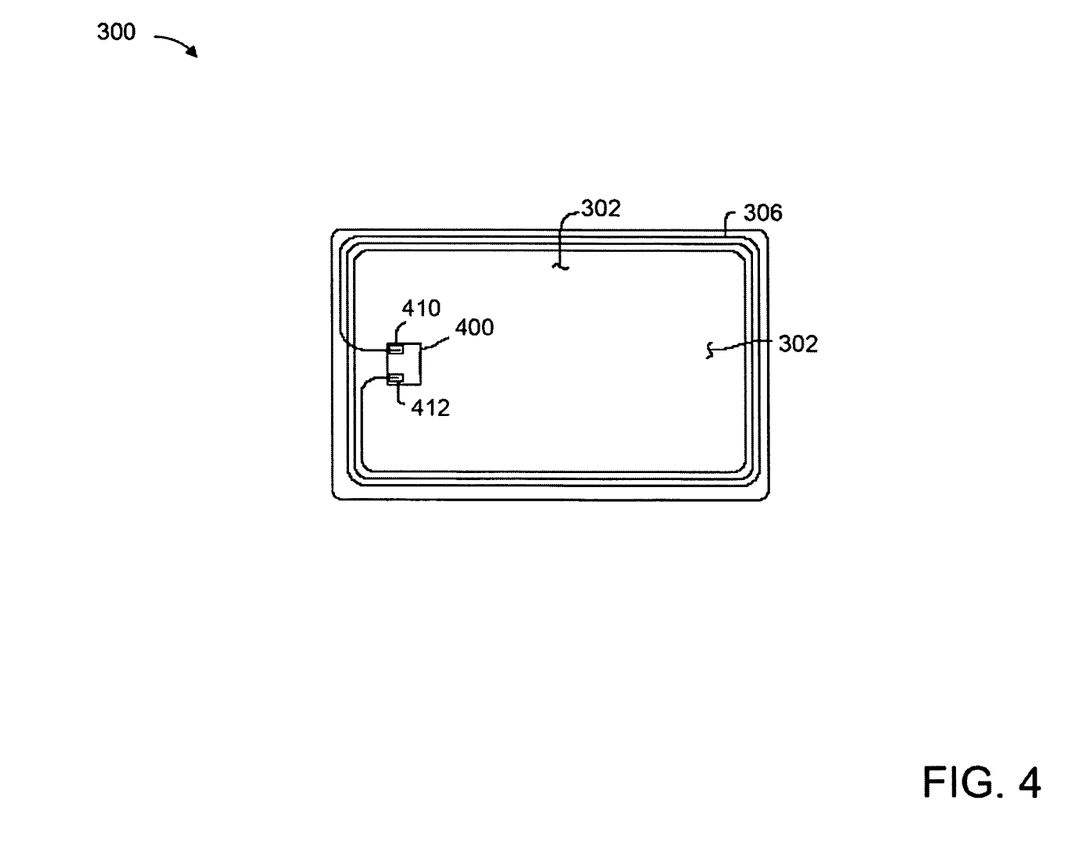
FIG. 4 is a schematic plan view of a personalization token, according to some embodiments.

FIG. 4 is a schematic plan view of one embodiment of the personalization token 300. Referring to FIG. 4, in this embodiment, the personalization token 300 has a support structure 302 with an outer surface that defines a card shaped body. The card shaped body may be formed of plastic or other suitable material and may resemble a conventional payment cards in shape and size. In some embodiments, the card shaped body has dimensions defined for the standard card referred to as "ID1" in ISO/IEC standard 7810, promulgated by the International Standardization Organization.

In this embodiment, the personalization token 300 further includes an RFID IC 400 and an antenna 306. RFID IC 400 includes the control/storage circuitry 304 (FIG. 3) and the transmit/receive circuitry 308 (FIG. 3) described hereinabove.

The antenna 306 may be mounted in, embedded in and/or otherwise supported by the card-shaped body. As shown, the antenna 306 may comprise several loops arranged along the periphery of the card-shaped body. Alternatively, the antenna 306 may be of a different type and/or configuration.

The RFID IC 400 may include electrically conductive contact pads 410, 412 via which the transmit/receive circuitry 308 (FIG. 3) of RFID IC 400 may be electrically connected to the antenna 306.

One or more logos and/or brands, including for example the brand/logo of a national and/or international payment card association such as MasterCard International Incorporated, may be provided on one or more surfaces of the personalization token 300. The brand/logo of the issuer may also be provided, as well as, for example, a specific card product brand. Embossed or non-embossed numbers and/or letters may be provided on the personalization token to indicate one or more account numbers and/or a name of an account holder. Other features that may be provided on the personalization token 300 are an adhesive paper strip to receive the signature of the cardholder, and a security code or the like printed on the adhesive strip. In addition, the personalization token may have one or more magnetic stripes (not shown) to allow the personalization token to be read by a magnetic card reader.

Figure 5:
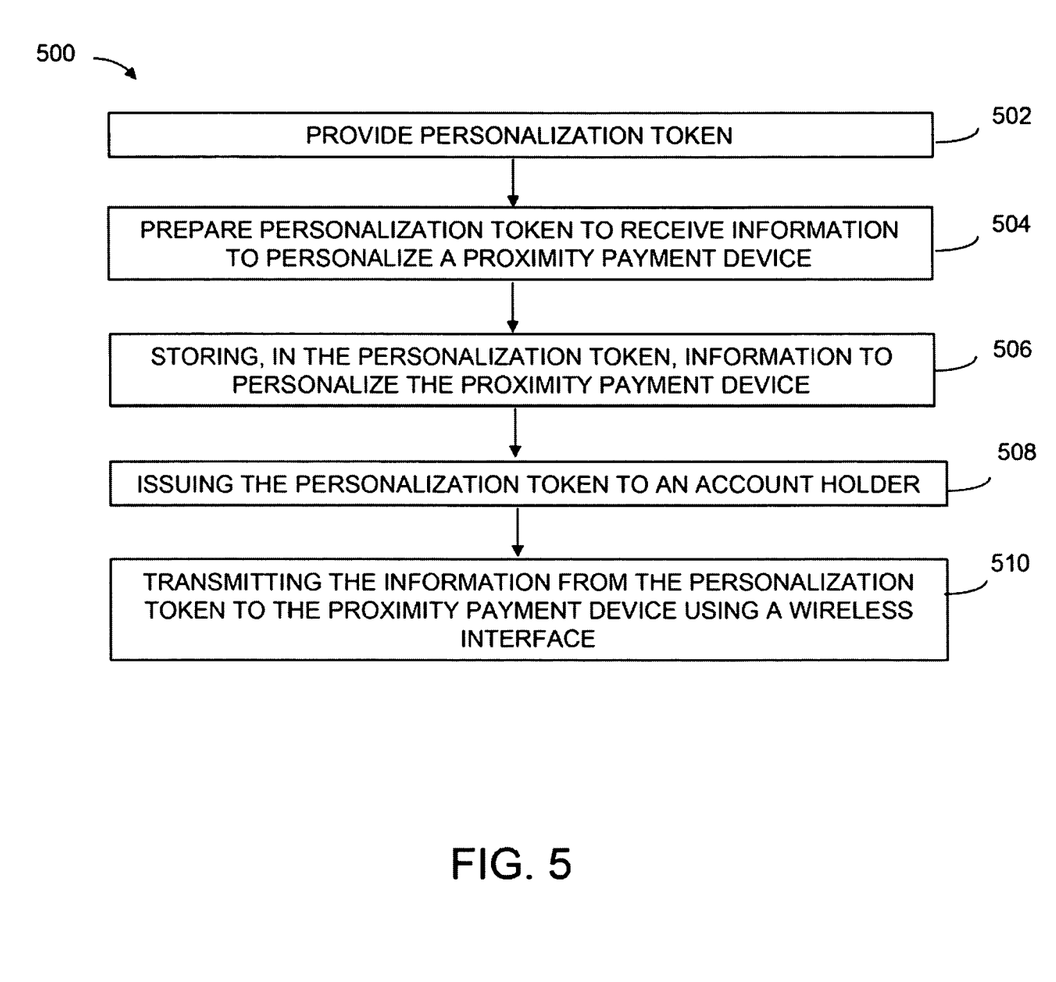
FIG. 5 is a flow chart that illustrates a method in accordance with some embodiments.

FIG. 5 is a flow chart 500 of a method according to some embodiments. In some embodiments, the method may be used in storing information in the personalization token 300 and transmitting information to the proximity payment device 100. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include providing a personalization token to store information to personalize a proximity payment device.

At 504, the method may further include preparing the personalization token to receive information to personalize the proximity payment device. This may include transmitting information to the personalization token and may include one or more steps normally performed during "pre-personalization" of a proximity payment device.

The information may include one or more parameters (such as to select a particular card brand to be borne by the proximity payment device). The information may also include one or more programs to be stored in the personalization token and executed in personalizing the proximity payment device.

Some embodiments may transmit the information to the personalization token using a wireless communication interface. In such embodiments, the personalization token may receive the information using a wireless communication interface. Some embodiments may use contactless card programming equipment commonly used to program proximity payment cards, such as for example, a model 9000 available from Datacard Group, Minnetonka, Minn.

Information such as a payment card association brand, etc., may be printed on the personalization token. In some embodiments, personalization tokens are processed as a batch. The information transmitted to each personalization token and/or printed on each personalization token may be the same for all personalization tokens in the batch.

At 506, the method may further include storing, in the personalization token, information to personalize the proximity payment device. This may include transmitting information to the personalization token and may include one or more steps normally performed during "pre-personalization" and/or "personalization" of a proximity payment device.

The information may include authentication data to be used in personalizing the proximity payment device, one or more keys to be used in personalizing the proximity payment device and/or one or more keys to be used by the proximity payment device in operating as a proximity payment device. The authentication data and/or key(s) may be used in helping to secure the process of personalizing the proximity payment device. In that regard, in some embodiments the authentication data may be used in authenticating the personalization token to the identification token. One or more of the one or more keys may be used in encrypting information to be transmitted from the personalization token to the identification token, which may help to protect the integrity of such information.

In some embodiments, the information may include a payment account number, a name of an account holder and/or an expiration date, if appropriate.

The information may also include one or more programs to be stored in the personalization token. One or more of such programs may be executed in the personalization token in personalizing the proximity payment device. One or more of the programs may be transmitted to the proximity payment device and executed in the proximity payment in personalizing the proximity payment device.

Some embodiments may transmit the information to the personalization token using a wireless communication interface. In such embodiments, the personalization token may receive the information using a wireless communication interface. Some embodiments may use contactless card programming equipment commonly used to program proximity payment cards, such as for example, a model 9000 available from Datacard Group, Minnetonka, Minn.

In some embodiments, a payment account number and/or any other information (or a portion thereof) stored in the personalization token may be printed on a surface of the personalization token.

In some embodiments, 504 and 506 are combined into one operation.

At 508, the method may further include issuing the personalization token to an account holder. In some embodiments, this may be carried out by mailing the personalization token to the account holder.

At 510, the method may further include transmitting the information from the personalization token to the proximity payment device using a wireless interface. In some embodiments, storing in a personalization token comprises storing in a personalization token located at a first location and transmitting the information from the personalization token comprises transmitting the information from the personalization token, with the personalization token located at a second location that is different than the first location.

FIGS. 6A-6E show a flow chart 600 of a method that may be used in transmitting the information from a personalization token to a proximity payment device, according to some embodiments. In some embodiments, the method may be used in transmitting information from the personalization token 300 to the proximity payment device 100. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

Figure 6A:
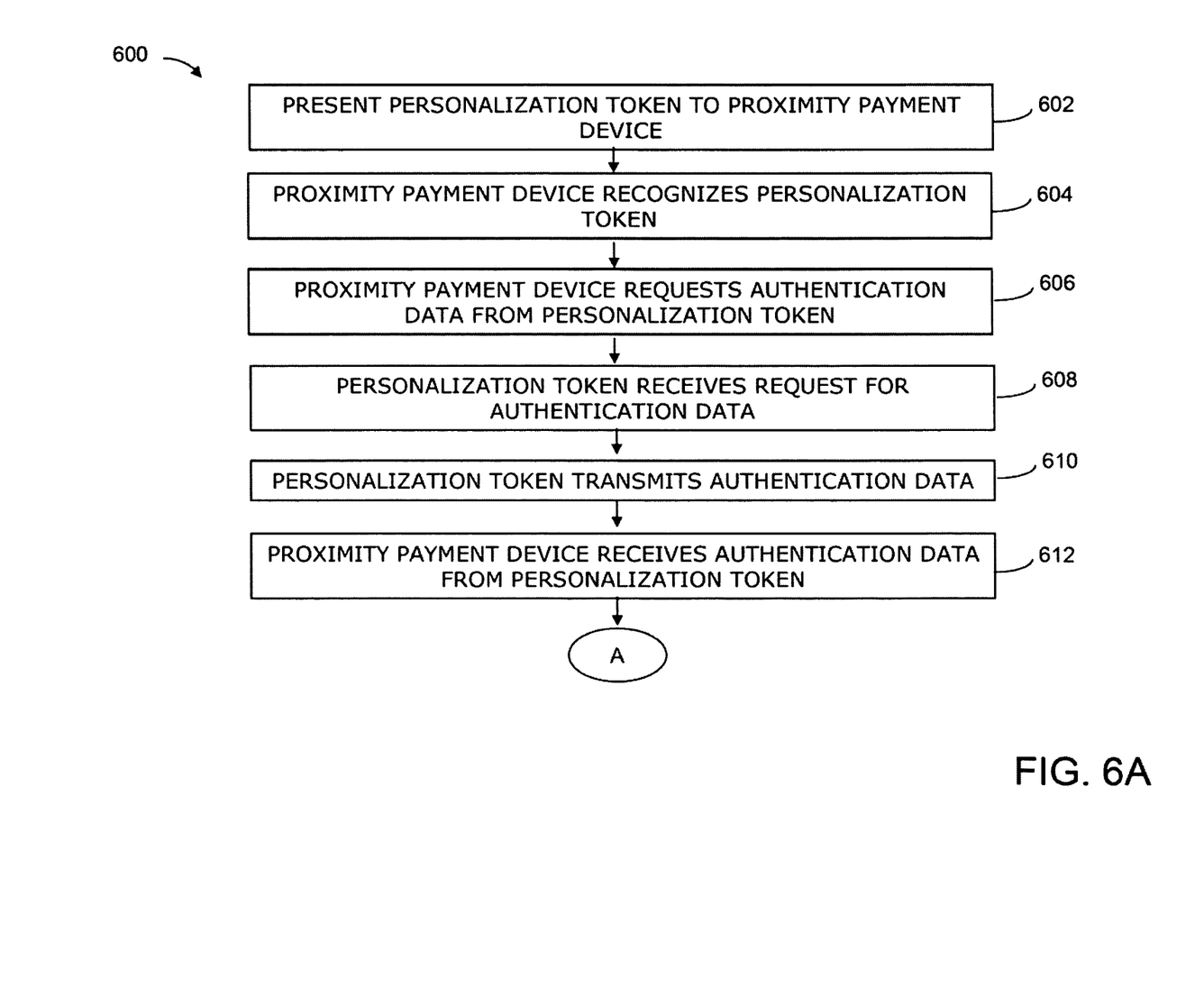
FIGS. 6A-6E are flow charts that illustrate a method in accordance with some embodiments.

At 602, the method may include presenting a personalization token to a proximity payment device. In some embodiments, the personalization token may be presented to the proximity payment device by simply positioning the personalization token within wireless communication range of the proximity payment device. In some embodiments, the personalization token may be presented to the proximity payment device by positioning the personalization token in physical contact with, and/or by tapping a portion of the personalization token on, the proximity payment device.

At 604, the proximity payment device may recognize the personalization token, and at 606, the proximity payment device may request authentication data from the personalization token. In some embodiments, the request may be transmitted via the antenna 206 (FIG. 2) and may be similar to an interrogation signal of the above-mentioned "PayPass" standard.

At 608, the personalization token may receive the request. In some embodiments, the request may be received via the antenna 306 and may cause the personalization token to be powered-up. For example, the personalization token may include circuitry to rectify the received request signal to generate DC power that may be used to power the control/storage circuitry 304 (FIG. 3) and transmit/receive circuitry 308 (FIG. 3). In some embodiments, the personalization token may include circuitry that operates in accordance with ISO/IEC 14443.

At 610, the personalization token may transmit the authentication data to the proximity payment device. At 612, the proximity payment device may receive the authentication data, and at 614, the proximity payment device may determine whether the personalization token is authentic. If the proximity payment device determines that the personalization token is not authentic, then at 618, the proximity payment device may inform a user that the personalization token is not authentic. In some embodiments, one or more other authentication protocols may be used in addition to and/or in lieu of the authentication protocol shown at 606-614.

Figure 6B:
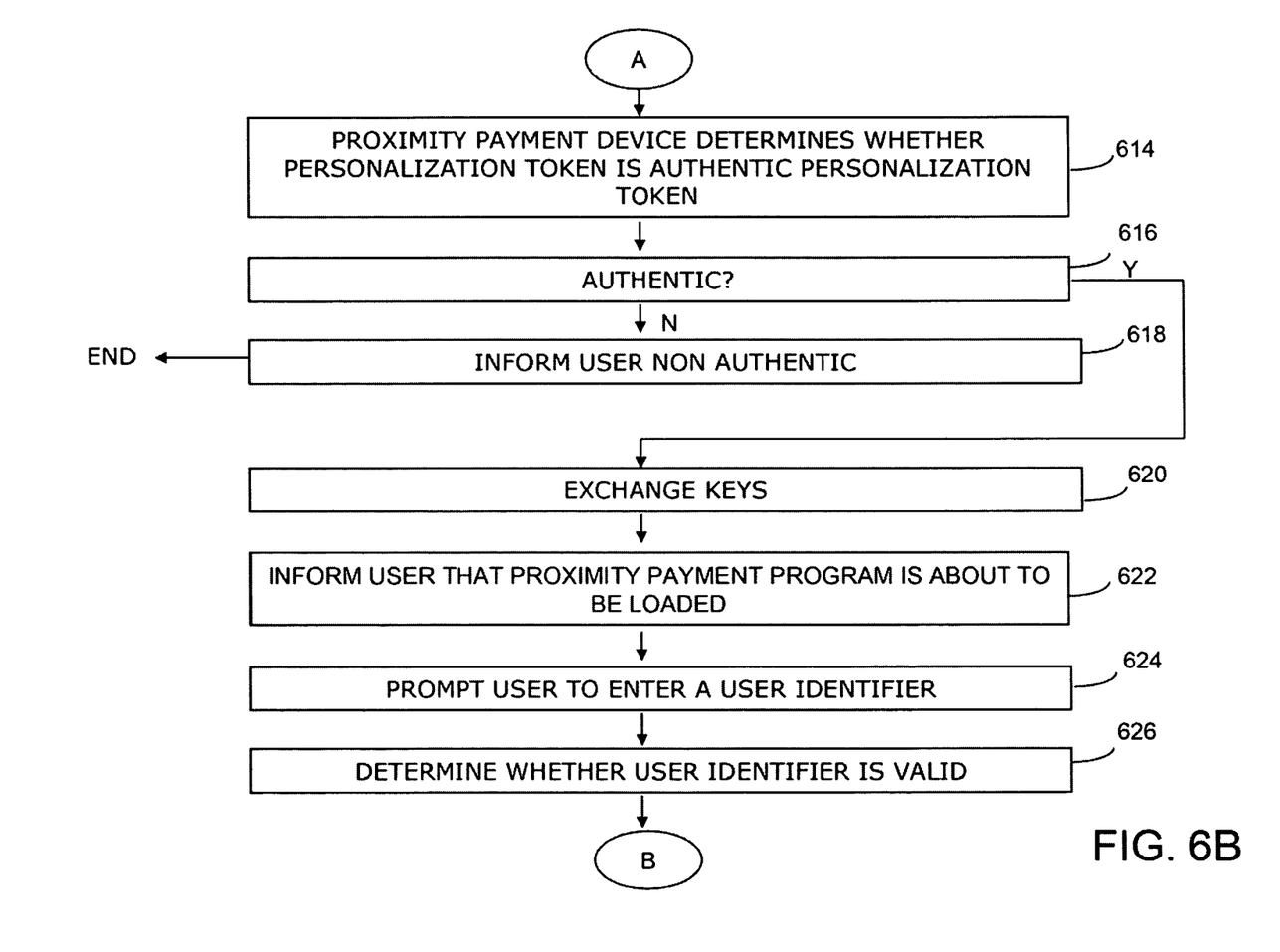

At 616, if the proximity payment device determines that the personalization token is authentic, then at 620, the proximity payment device and the personalization token may exchange one or more keys. At 622, the proximity payment device may inform the user that a proximity payment program is about to be loaded. At 624, the proximity payment device may prompt the user to enter a user identifier. If the user enters a user identifier, then at 626, the proximity payment device may determine whether the user identifier is valid. If the proximity payment device determines that the user identifier is not valid, then at 630, the proximity payment device may inform the user that the user identifier is not valid.

In some embodiments, the proximity payment device may inform and/or prompt the user using a display. In some embodiments, information supplied to and/or by the display comprises information supplied by the personalization token. In some embodiments, information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the personalization token (iii) a brand and/or logo of a specific card product.

Figure 6C:
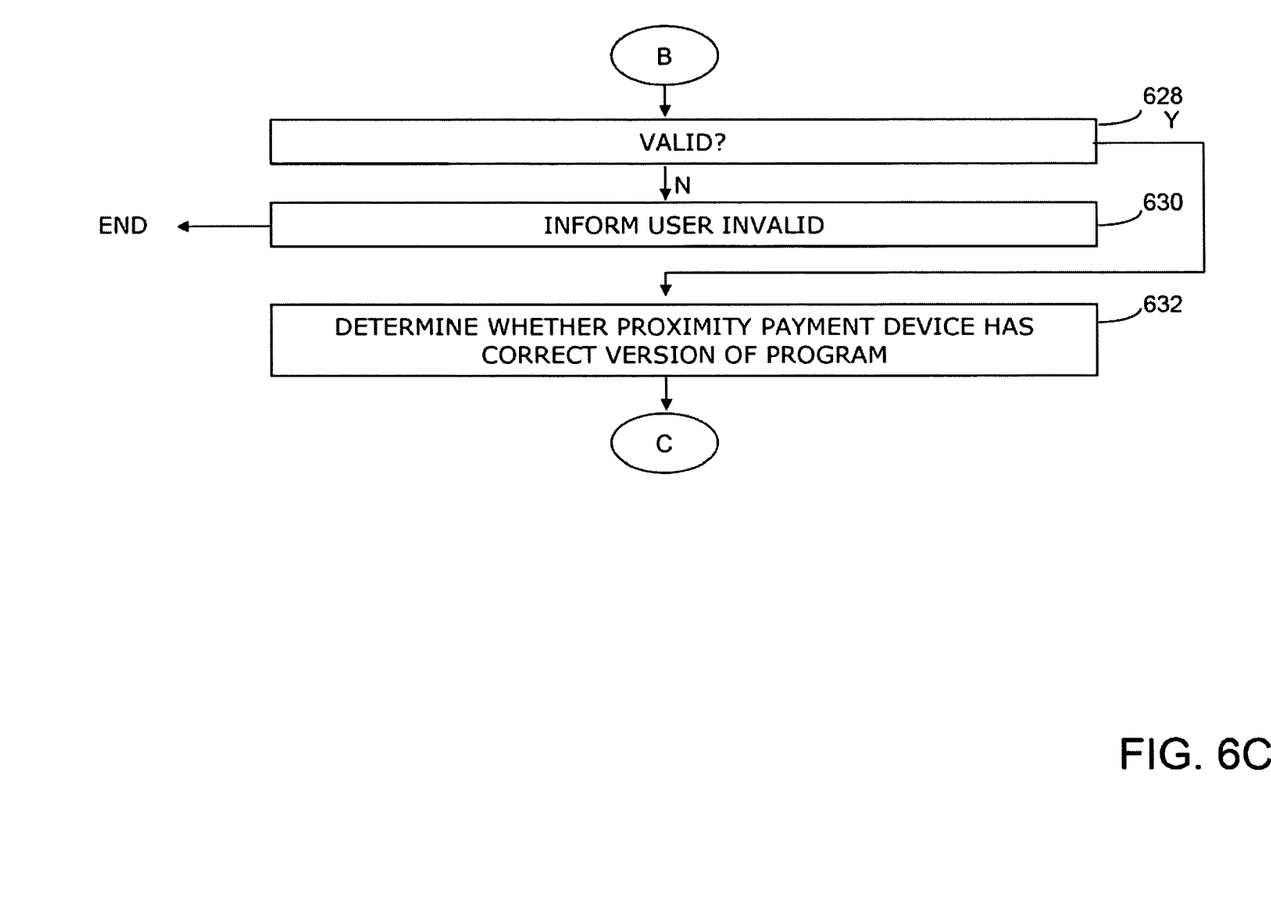

At 628, if the proximity payment device determines that the user identifier is valid, then at 630, the proximity payment device may determine whether the proximity payment device has a correct version of the proximity payment program. If the proximity payment device determines that it does not have the correct version of the proximity payment program, then at 636, the proximity payment device may determine whether the proximity payment device is compatible with the correct version of the proximity payment program. If the proximity payment device determines that it is not compatible with the correct version of the proximity payment program, then at 640, the proximity payment device may inform the user that it is not compatible with the correct version of the proximity payment program. In some embodiments, the proximity payment device may use a version already stored in the proximity payment device, even if it is not the correct version. In such embodiments, the method may proceed at 650 described below. In some other embodiments, the proximity payment device may not proceed with the method if the proximity payment device is not compatible with the correct version.

Figure 6D:
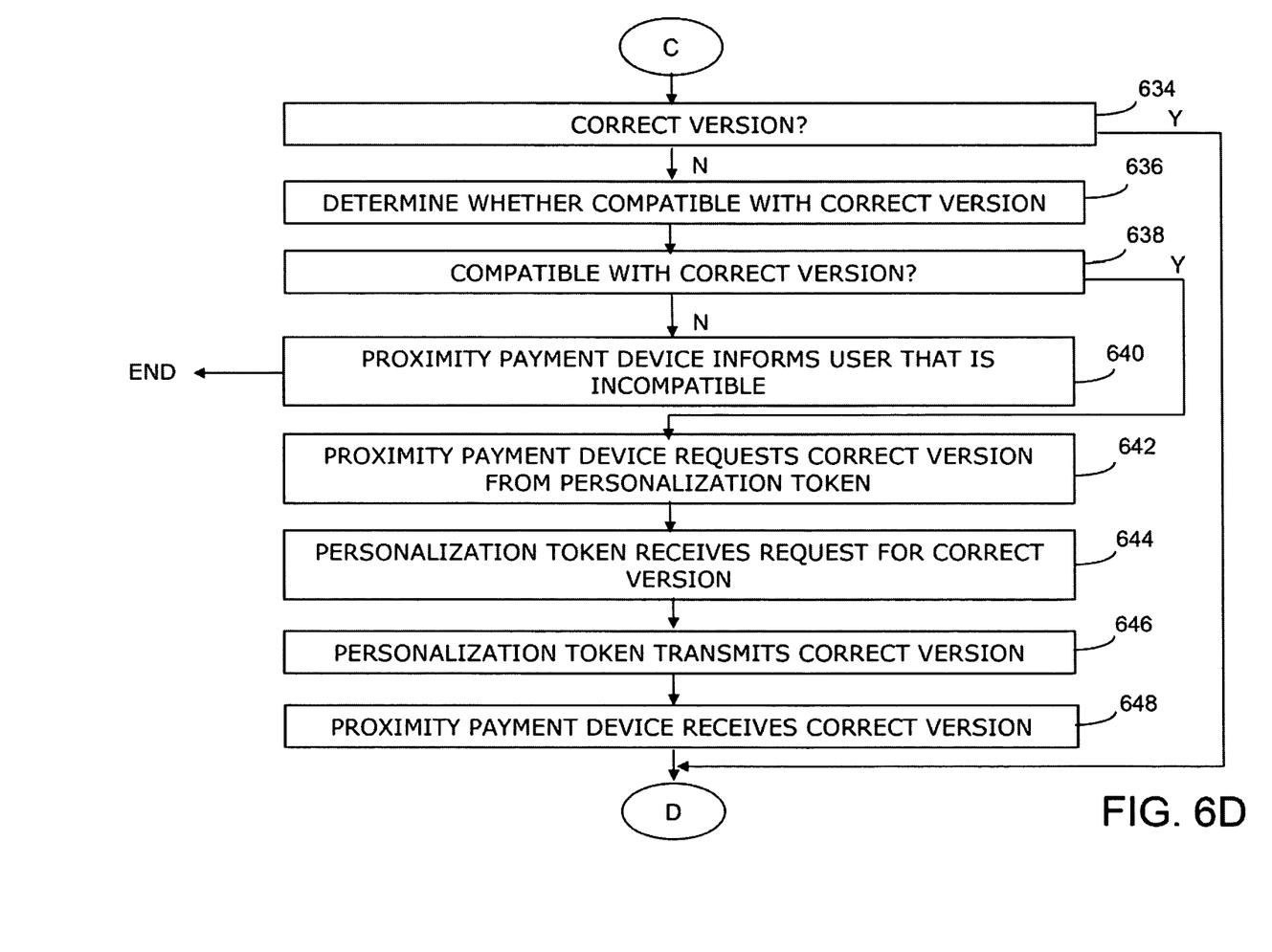

At 638, if the proximity payment device determines that it is compatible with the correct version of the proximity payment program, then at 642, the proximity payment device may request the correct version of the proximity payment program from the personalization token. At 644, the personalization token may receive the request, and at 646, the personalization may respond by transmitting the correct version of the proximity payment program to the proximity payment device. At 648, the proximity payment device may receive the correct version of the proximity payment program.

At 650, the personalization token may transmit information to personalize the proximity payment device. At 652, the proximity payment device may determine whether the personalization was successful. If the proximity payment device determines that the personalization was not successful, then at 656, the proximity payment device may inform the user that the personalization was not successful.

Figure 6E:
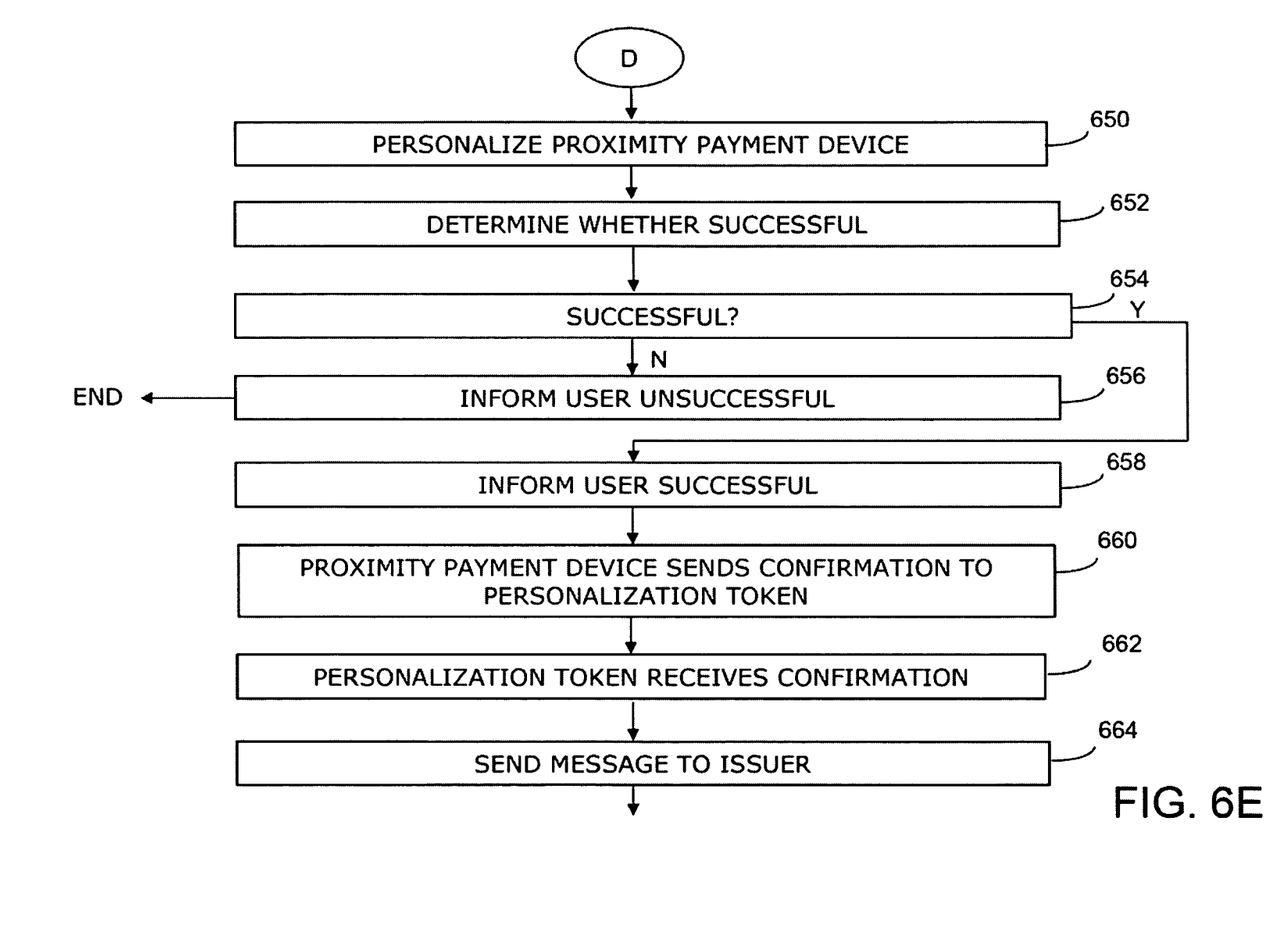

At 654, if the proximity payment device determines that the personalization was successful, then at 658, the proximity payment device may inform the user that the personalization was successful.

At 660, the proximity payment device may send confirmation to the personalization token, and at 662, the personalization token may receive the confirmation.

In some embodiments, the personalization token may be permitted to personalize any number of proximity payment devices. In some embodiments, the personalization token may be programmed to personalize only a limited number of proximity payment devices. In some embodiments, the personalization token may include a counter indicative of the number of proximity payment devices that may be personalized by the personalization token. The counter may be decremented in response to the confirmation from the proximity payment device. If the counter reaches zero, the personalization token may no longer be used to personalize a proximity payment device. Some embodiments may allow the issuer to reset or increment the counter so that the personalization token may again be used to personalize a proximity payment device.

At 664, the proximity payment device may send a message to the issuer of the personalization token, if possible. If the device comprises a cell phone, the proximity payment device may send the message via the cellular network.

After personalization, the device 100 may operate as a proximity payment device. In some embodiments, the proximity payment device may operate in accordance with the above-mentioned "PayPass" standard. In that regard, in some embodiments, the proximity payment device may be presented to a proximity coupling device (not shown) of a POS terminal (not shown) to accomplish payment for a sales transaction. The proximity coupling device may transmit an interrogation signal. The proximity payment device may receive the interrogation signal and may transmit a signal to the proximity coupling device in response thereto. One or more signals transmitted by the proximity payment device may include a payment card account number and/or other information required for interaction with the proximity coupling device. In some embodiments, the proximity payment device may transmit the payment account number and/or other information after a handshake procedure or the like with the POS terminal. The POS terminal may then interact with a payment card system to charge the current sales transaction to a payment card account represented by the payment account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

As stated above, in some embodiments, the personalization token 300 may also operate as a proximity payment device. In some such embodiments, such proximity payment device may operate in a conventional manner, e.g., in accordance with the above-mentioned "PayPass" standard. For example, the proximity payment device may be presented to a proximity coupling device (not shown) of a POS terminal (not shown) to accomplish payment for a sales transaction. The proximity coupling device may transmit an interrogation signal. The proximity payment device may receive the interrogation signal via the antenna 306 (FIG. 3). The received interrogation signal may cause the circuitry of the proximity payment device to be powered-up. For example, the proximity payment device may include circuitry to rectify the received interrogation signal to generate a DC power that may be used to power the control/storage circuitry 304 (FIG. 3) and transmit/receive circuitry 308 (FIG. 3). The proximity payment device may transmit a signal to the proximity coupling device in response to the interrogation signal. The proximity payment device may transmit the signal (and possibly one or more additional signals) to the proximity coupling device via the antenna 306. One or more signals transmitted by the proximity payment device may include a payment card account number and/or other information required for interaction with the proximity coupling device. In some embodiments, the proximity payment device may transmit the payment card account number and/or other information via the antenna 306 (FIG. 3) after a handshake procedure or the like with the POS terminal. The POS terminal may then interact with a payment card system to charge the current sales transaction to the payment card account represented by the payment card account number received from the proximity payment device.

Figure 7:
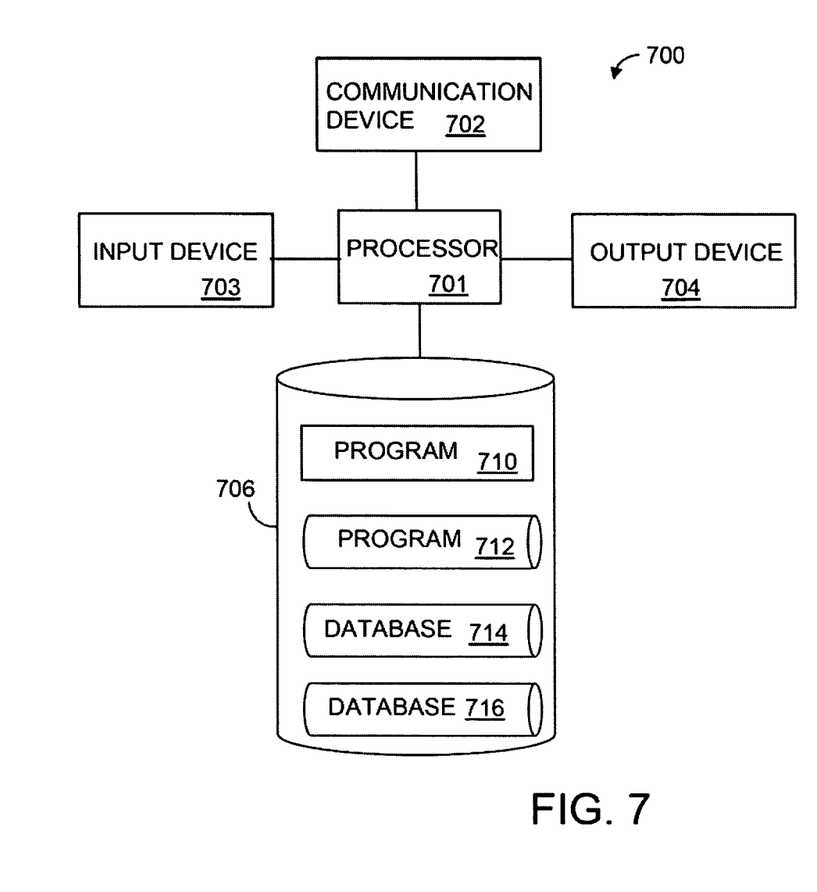
FIG. 7 is a schematic block diagram of an apparatus according to some embodiments.

FIG. 7 is a block diagram of an apparatus 700 according to some embodiments. In some embodiments, one or more of the devices (or portion(s) thereof) disclosed herein may have an architecture that is the same as and/or similar to one or more portions of the architecture of apparatus 700.

Referring to FIG. 7, in accordance with some embodiments, the apparatus 700 includes a processor 701 operatively coupled to a communication device 702, an input device 703, an output device 704 and a storage device 706.

In some embodiments, the processor 701 may execute processor-executable program code to provide one or more portions of the one or more functions disclosed herein and/or to carry out one or more portions of one or more embodiments of one or more methods disclosed herein. In some embodiments, the processor 701 may be a conventional microprocessor or microprocessors.

The communication device 702 may be used to facilitate communication with other devices and/or systems. In some embodiments, communication device 702 may be configured with hardware suitable to physically interface with one or more external devices and/or network connections. For example, communication device 702 may comprise an Ethernet connection to a local area network through which apparatus 700 may receive and transmit information over the Internet and/or one or more other network(s).

The input device 703 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 704 may comprise, for example, one or more devices used to output data and/or other information, such as, for example: an IR port, a docking station, a display, a speaker, and/or a printer, etc.

The storage device 706 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 706 may store one or more programs 710-712, which may include one or more instructions to be executed by the processor 701.

In some embodiments, the one or more programs may include one or more operating systems, database management systems, other applications, other information files, etc., for operation of the apparatus 700.

The storage device 706 may store one or more databases 714-716 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or a storage medium readable by a processing system.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

As used herein, a signal may be any type of signal, i.e., an analog signal, a digital signal, a single ended signal, a differential signal and/or any other type of signal or combination thereof.

A wireless communication interface may be any type of wireless communication interface.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol.

As used herein, the term "proximity payment device" refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

As used herein, the term "identification token" refers to a device, of any shape, that serves as one or more of a proximity payment device, a transportation related device, an identification device, an RFID-enabled passport.

The principles taught herein have heretofore been described in the context of proximity payment devices. Nevertheless, these teachings are also applicable to any type of identification token. As used herein and in the appended claims the term "identification token" refers to a device, having a card shape or any other shape, that serves as one or more of a proximity payment device; a transportation related device; a device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

As used herein, an account number may be numeric, non numeric and/or a combination thereof.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for personalizing an identification token device for use as a proximity payment device for by a user, the method comprising:
    providing the identification token device to an account holder, the identification device being embodied in a device having a cellular telephone functionality;
    providing, separately from the identification token device, a personalization token device to the account holder, the personalization token device storing personalization information including at least a payment account number for an account associated with the account holder to use to personalize the identification token device with the payment account number associated with the account holder to enable the identification token device to operate as a proximity payment device using at least the payment account number for the account associated with the account holder;
    establishing a wireless communication session between the identification token device and the personalization token device;
    determining, by the identification token device, that the personalization token device is authentic based on authentication data received from the personalization token device via the wireless communication session;
    transmitting, wirelessly via the wireless communication session, the personalization information including at least the payment account number from the authenticated personalization token device to the identification token device to personalize the identification token device with at least the payment account number associated with the account holder, wherein the identification token device is subsequently operable as a proximity payment device to conduct a purchase transaction using the payment account number associated with the account holder based on the identification token device receiving the payment account number wirelessly transmitted from the authenticated personalization token device; and
    terminating the communication session between the identification token device and the authenticated personalization token device.

2. The method of claim 1 wherein the personalization information further comprises at least one of: name of a person associated with the account number, a program to be executed by the identification token device, and authentication data.

3. The method of claim 1 wherein the personalization information to personalize the identification token device comprises information to personalize a proximity payment device.

4. The method of claim 1 wherein the communication session is a wireless communication session between an RF antenna of the identification token device and an RF antenna of the authenticated personalization token device.

5. The method of claim 1 wherein the personalization token device comprises an identification token device.

6. The method of claim 1 wherein the personalization token device comprises a proximity payment device.

7. The method of claim 1 wherein the identification token device comprises an identification token device supported by a housing of a cell phone.

8. The method of claim 1 wherein the identification token device comprises an identification token device supported by a housing of a wristwatch.

9. The method of claim 1 wherein storing in the personalization token device comprises storing in a personalization token device located at a first location and wherein transmitting the personalization information from the personalization token device comprises transmitting the personalization information from the personalization token device, with the personalization token device located at a second location that is different than the first location.

10. The method of claim 1, further comprising:
    transmitting, from the identification token device to a remote issuer of the identification token device, at least a portion of the personalization information to confirm the personalization.

11. The method of claim 10, wherein the transmitting is performed at least in part over a wireless network.

12. A personalization token device issued to an account holder, the personalization token device comprising:
    a wireless communication interface;
    a processor; and
    a storage area storing computer program code for execution by the processor and further storing personalization information including at least a payment account number for an account holder to use to personalize an identification token device with the payment account number associated with the account holder to enable the identification token to operate as a proximity payment device using at least the payment account number for the account associated with the account holder;
    wherein the processor is operable to:
        establish, using the wireless communication interface, a wireless communication session between the personalization token device and the identification token device, the identification token device being embodied in a device having a cellular telephone functionality;
        authenticate the personalization token device to the identification token device by providing authentication data from the personalization token device to the identification token device via the wireless communication session, and
        transmit, wirelessly via the wireless communication session, the personalization information including at least the payment account number from the authenticated personalization token device to the identification token device to personalize the identification token device with at least the payment account number associated with the account holder, wherein the identification token device is subsequently operable as a proximity payment device to conduct a purchase transaction using the payment account number associated with the account holder based on the identification token device receiving the payment account number wirelessly transmitted from the authenticated personalization token device.

13. The personalization token device of claim 12 wherein the personalization information further comprises at least one of: a name of a person associated with an account number, a program to be executed by the identification token, and authentication data.

14. The personalization token device of claim 12 wherein the personalization information comprises information to personalize a proximity payment device.

15. The personalization token device of claim 12 wherein the wireless communication interface comprises an RF antenna.

16. The personalization token of claim 12 wherein the personalization token device comprises an identification token device.

17. The personalization token device of claim 12 wherein the personalization token device comprises a proximity payment device.

* * * * *